United States Patent [19]

Gimel et al.

[11] Patent Number: 4,500,891

[45] Date of Patent: Feb. 19, 1985

[54] PROCESS FOR PRINTING DOTS ON A HEAT SENSITIVE PAPER BY A THERMAL PRINTER AND PRINTER USING THIS PROCESS

[75] Inventors: Bernard Gimel; Christian DeFay, both of Paris, France

[73] Assignee: Thomson-CSF, Paris, France

[21] Appl. No.: 458,876

[22] Filed: Jan. 18, 1983

[30] Foreign Application Priority Data

Jan. 29, 1982 [FR] France ............................... 82 01451

[51] Int. Cl.³ ............................................ G01D 15/10

[52] U.S. Cl. ............................... 346/76 PH; 364/518; 364/519

[58] Field of Search ................ 364/518, 519; 219/216; 400/120; 346/1.1, 76 PH

[56] References Cited

U.S. PATENT DOCUMENTS

| | | | |
|---|---|---|---|
| 3,951,247 | 4/1976 | Montanari | 346/76 PH |
| 4,224,869 | 9/1980 | Morin | 346/76 PH |
| 4,300,142 | 11/1981 | Kos | 346/76 PH |
| 4,409,599 | 10/1983 | Yasuda et al. | 346/76 PH |

*Primary Examiner*—E. A. Goldberg

*Assistant Examiner*—A. Evans

*Attorney, Agent, or Firm*—Cushman, Darby & Cushman

[57] ABSTRACT

The process applies to the printing of dots on a heat sensitive paper by using a thermal printer incorporating a printing head formed by N heating resistors aligned in the direction of the line to be printed, signal input devices representing the dots to be printed, means for storing the signals received by the input devices, as well as means for controlling the displacement of the printing head and the heating of the resistors corresponding to the locations of the dots to be printed. It consists of preventing the displacement of the printing head and permitting the heating of the resistors when, the number of points to be printed and stored within the storage means, exceeds a predetermined number of dots, so as to ensure that the number of dots to be stored does not exceed the storage capacity of the storage means.

This process is performed by the thermal printer described.

6 Claims, 3 Drawing Figures

PROCESS FOR PRINTING DOTS ON A HEAT SENSITIVE PAPER BY A THERMAL PRINTER AND PRINTER USING THIS PROCESS

BACKGROUND OF THE INVENTION

The present invention relates to a process for printing dots on a heat sensitive paper by using a thermal printer and thermal printer using the said process.

A process is known for printing dots on heat sensitive paper by means of a thermal printer, whose head has N resistors spaced by twice the spacing of the dot to be printed and aligned in the direction of the line to be printed.

According to the process, the printing of a line with 2N dots involves two stages. During the first stage, the printing head is kept stationary and the resistors corresponding to the dots to be printed are heated. During the second stage, the printing head is displaced by one spacing in the direction of the line in question, so that the resistors corresponding to the locations of the dots in the line still to be printed are heated. To prevent any streaks forming on the paper, the heating times for the resistors are spaced by the displacement times of the printing head and the displacement times of the paper beneath the printing head for positioning the latter on the new line to be printed. As a result of this process, the time for printing a line is constant and it is relatively easy to synchronize reception of the data with the device supplying the same. However, the data relative to a line can come from random devices, such as computer off-line control systems and, when they arrive with a variable timing, it is necessary to provide devices for storing said data using e.g. a buffer store and then the stored data is transferred to the printing mechanism of the printer.

The size of the storage devices or the buffer stores is determined on the one hand as a function of the maximum amount of data or dots which can be received per unit of time and on the other hand as a function of the printing speed of the printer. Thus, the size of the stores used increases as the printing speed decreases relative to the speed of the data received.

For limiting the size of the storage devices, without incurring the risk of any overflow thereof, numerous solutions have been proposed, which mostly reduce the printing time of the printers by increasing their printing speed.

SUMMARY OF THE INVENTION

It is the object of this invention to provide a process for further increasing the printing speed of thermal printers.

The invention therefore relates to a process for printing dots on a heat sensitive paper by means of a thermal printer comprising a printing head formed by N heating resistors regularly spaced and aligned in the direction of the line to be printed, signal input devices representing the dots to be printed, means for storing the signals received by the input devices, as well as control means for the displacement of the printing head and the heating of the resistors corresponding to the dots to be printed. According to this process, in a first stage the resistors corresponding to the locations of the dots to be printed in a line directly facing these resistors are heated and in a second stage the printing head is displaced to again heat the resistors of the head corresponding to the locations of the dots in the lines which still have to be printed. The process also consists of preventing the displacement of the printing head and permitting the heating of the resistors corresponding to the dots remaining to be printed during the second stage when the number of dots to be printed and stored in the storage means exceeds a predetermined number of dots, in order to ensure that the number of dots to be stored does not exceed the storage capacity of the storage means.

The invention also relates to a thermal printer for performing the process described hereinbefore and which comprises a printing head formed by N heating resistors aligned in the direction of the line to be printed, signal input devices representing the dots to be printed, means for storing the signals received by the input device, control means for the displacement of the printing head and the heating of the resistors corresponding to the dots to be printed, as well as means for inhibiting the printing head displacement control means, when the number of dots to be printed and stored in the storage means exceeds a predetermined number of dots in order to prevent an overflow of the capacity of the storage means.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
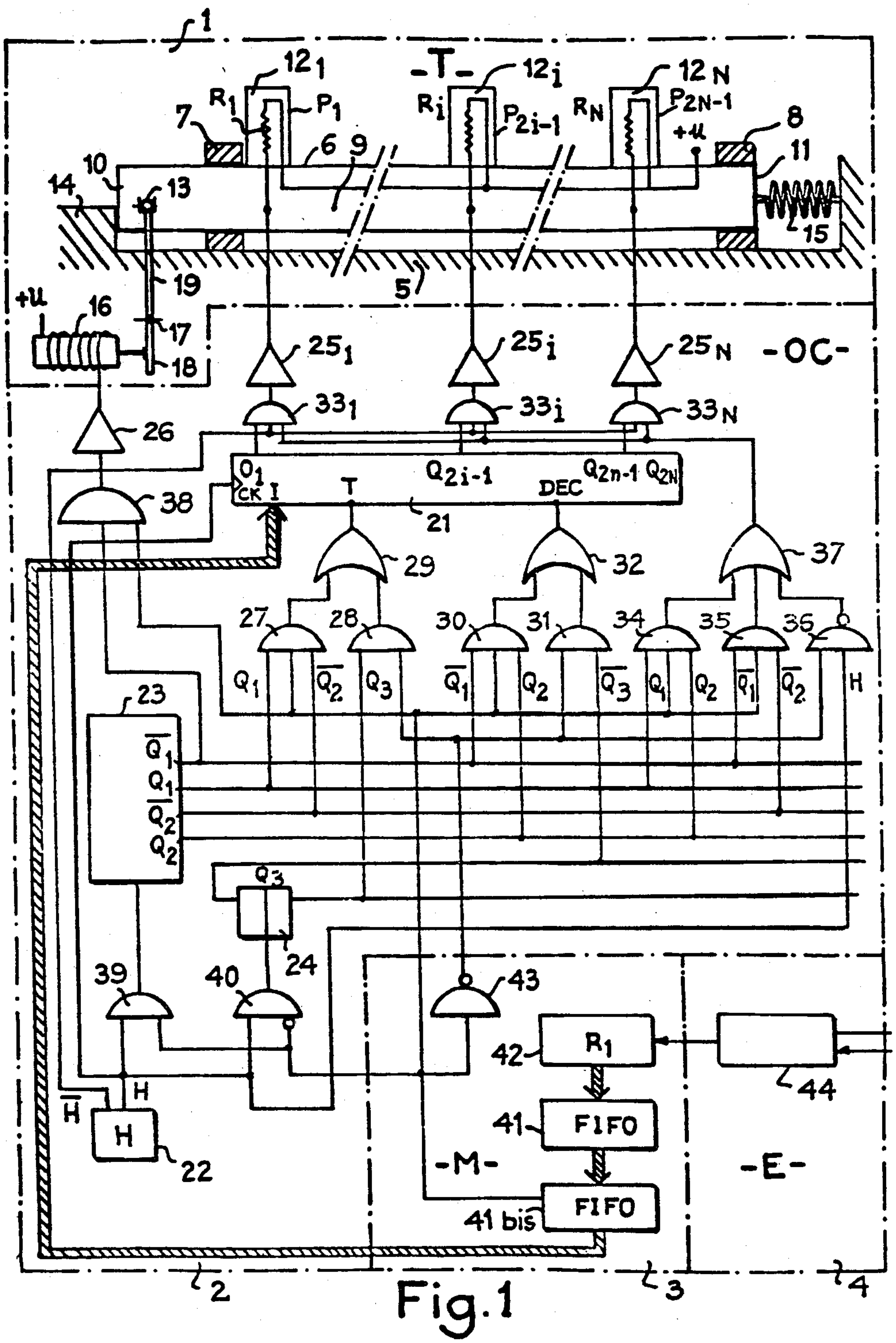
FIG. 1 the printing mechanism of the thermal printer according to the invention, associated with its control device.

The printing mechanism shown in FIG. 1 comprises a printing head 1, a control member 2, storage means 3 and an input/output device 4, represented in the dotted lines. The printing head 1 comprises a support 5, an electrode holder 6 and means 7, 8 for the guidance in translation of electrode holder 6. Guidance means 7, 8 rest on support 5. Electrode holder 6 is constituted by a slide 9 having ends 10, 11. Electrode holder 6 also comprises N projecting electrodes $12_1$ to $12_N$ arranged along the major longitudinal axis of the slide and which are constituted by resistors $R_1$ to $R_N$. These electrodes face a heat sensitive printing paper which, in per se known manner and consequently not shown, is driven by a device for the stepwise displacement of the paper in order to ensure the printing of the information lines which are to appear on the paper. Slide 9 also comprises a pivot 13. Slide 9 is limited in its translational displacement in one direction by an abutment 14 resting on support 15 and on which bears end 10 of slide 9, when the latter is in the rest position, and in the other position by a spring 15, positioned between end 11 of slide 9 and support 5. An electromagnet 16 is fixed to support 5 in such a way as to act on a lever, articulated to a pivot 17 integral with support 5 and formed by arms 18, 19 located on either side of pivot 17, in such a way that arm 18 can be attracted by electromagnet 16. The end of arm 19 is articulated to pivot 13 of slide 9.

Control member 2 comprises a shift register 21, a sequencer constituted by a clock 22, a counter 23 and a flip-flop 24. The control member 2 also comprises heating amplifiers $25_1$ to $25_N$, each connected to one end of the resistors $R_1$ and $R_N$ *of the printing head, in such a* way as to supply with power the said resistors and to heat the same. A control amplifier 26 controls electromagnet 16. Shift register 21 comprises 2N flip-flops, which can be loaded in parallel by binary signals reaching the parallel inputs I thereof. The loading control takes place synchronously with signal H of clock 22, applied to its input $C_K$ and a binary signal of logic level 1 applied to its input T. The displacement of the binary signals stored in shift register 21 is ensured by the application, synchronously with the signal H applied to its input $C_K$, of a binary signal of logic level 1 to input DEC of shift register 21. The binary signals present at input I within shift register 21 are transferred by means of two AND gates 27, 28 and the OR gate 29. The output of OR gate 29 is connected to input T of shift register 21 and its two inputs are respectively connected to the outputs of the AND gates 27, 28. The AND gate 27 has three inputs, a first input being connected to output $Q_1$ of counter 23, a second input being connected to the output $\overline{Q_2}$ of counter 23 and a third input receives the "$\overline{\text{full}}$" information from the storage means 3. The AND gate 28 has two inputs, a first input being connected to output $Q_3$ of flip-flop 24 and a second input receiving the "full" information from storage means 3. The control of the displacement of the signals stored within shift register 21 is ensured by a displacement control logic constituted by AND gates 30, 31 and OR gate 32. The output of the OR gate 32 is connected to input DEC of shift register 21 and its two inputs are respectively connected to the output of the AND gate 30 and to the output of the AND gate 31. AND gate 31 has three inputs, the first input being connected to output $\overline{Q_1}$ of counter 23, the second input being connected to output $Q_2$ of counter 23 and the third input receiving the "$\overline{\text{full}}$" information from storage means 3. AND gate 31 has two inputs, the first input receiving the "full" information from storage means 3 and the second input being connected to output $\overline{Q_3}$ of flip-flop 24. The outputs of uneven ranks $Q_1$ to $Q_{2n-1}$ of shift register 21 are respectively connected to the inputs of AND gates $33_1$ to $33_N$, whose outputs are respectively connected to the inputs of heating amplifiers $25_1$ to $25_N$. AND gates $33_1$ to $33_N$ ensure the control of the heating amplifiers when they are controlled on the second input by a control logic constituted by AND gates 34, 35, NAND gate 36 and OR gate 37, and on their third input by signal $\overline{H}$ from clock 22. The output of OR gate 37 is connected to the second input of AND gates $33_1$ to $33_N$. The OR gate 37 has three inputs respectively connected to the outputs of the AND gates 34, 35 and the NAND gate 36. AND gate 34 has three inputs, a first input being connected to output $Q_1$ of counter 23, the second input being connected to output $Q_2$ of counter 23 and the third input receiving the "$\overline{\text{full}}$" information from storage means 3. AND gate 35 also has three inputs, the first input being connected to output $\overline{Q_1}$ of counter 23, a second input being connected to output $\overline{Q_2}$ of counter 23 and the third input receiving the "$\overline{\text{full}}$" information from storage means 3. The NAND gate 36 has two inputs, a first input receiving the "full" information from storage means 3 and the second input being connected to the output of clock 22. Control amplifier 26 of electromagnet 16 is controlled by AND gate 38, which has two inputs respectively connected to output $\overline{Q_1}$ of counter 23 and the output supplying the "$\overline{\text{full}}$" information from storage means 3. Counter 23 is advanced by gate 39 whereof one input is connected to the output of clock 22 *and whereof the other input receives the "$\overline{\text{full}}$"* information from storage means 3. Flip-flop 24 is switched by gate 40, whereof one input is connected to the output of clock 22 and whereof the other reversing input receives the "$\overline{\text{full}}$" information from storage means 3.

Storage means 3 are constituted by buffer stores 41 and 41*bis*, organized into several words of 2N data bits, each corresponding to the number of dots which can be printed on a line of the printer paper. The data input of store 41 is connected to the parallel outputs of a register 42, which stores the data bits received by the printer, corresponding to the printing of 2N dots on a line. The stores 41 and 41*bis* are organized in the "FIFO" mode, according to which the data leaving the store are in the same order as at the time when they entered it. These stores have a state indicator assuming logic state 1, when the number of data words stored in the store reaches the maximum storage capacity thereof. In the case of FIG. 1, the indication of the state of store 41*bis* is indicated by the "$\overline{\text{full}}$" signal, which has a logic level 1, when store 41*bis* is not completely filled and a logic level 0, when the store is full. The "$\overline{\text{full}}$" information is reversed by reversing means 43 in order to supply the "full" information. The state indications "$\overline{\text{full}}$" of store 41*bis* and "full" of reversing means 43 are used as inhibiting means for the aforementioned control logics.

The input/output device 4 is constituted, within the scope of FIG. 1, by a modulator/demodulator 44, which supplies the data relative to the dots to be printed, in a series binary coded form, for the input of register 42 of storage means 3.

The device described hereinbefore functions in the following way. The data reach the printer at the input of the modulator/demodulator 44, which supplies a sequence of binary signals, each representing the state of one dot on the line to be printed and having state 0 or state 1, as a function of whether the corresponding dot is to be blackened or remain white. These signals are transmitted in series to the input of register 42 and are then transferred into store 41, whenever 2N signals representing 2N dots of a line have been stored in register 42. The words of the 2N signals formed in this way are successively transferred in per se known manner into store 41 and then into store 41*bis*, so as to be successively applied to input I of shift register 21 in the order of their arrival. A risk of overflow is indicated by the state of an area in memory 41*bis*, which assumes logic level 1, when the number of words stored in memory 41*bis* reaches the maximum storage capacity thereof, this situation leading to the appearance of a logic level 0 signal at the "$\overline{\text{full}}$" output of store 41*bis*. As a function of state 0 or state 1 of the "$\overline{\text{full}}$" output, two types of situation can arise.

Figure 2:
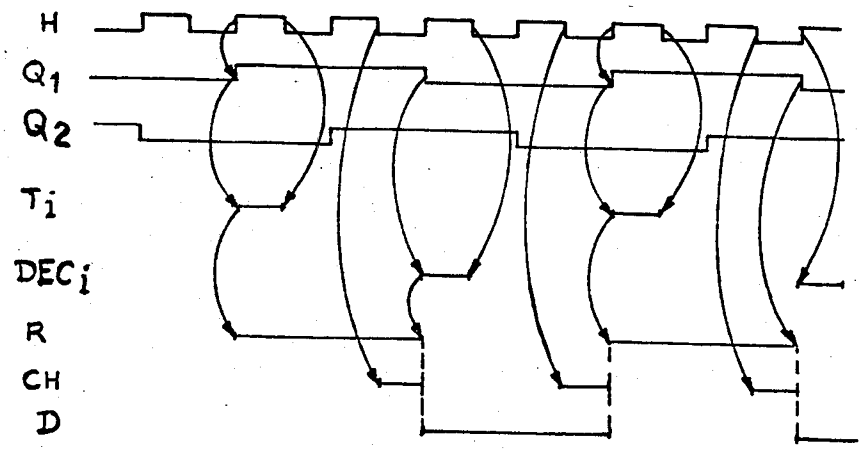
FIG. 2 a time diagram representing an operation of the printer when there is no risk of the storage means overflowing.

In a first type, when the "$\overline{\text{full}}$" output has level 1, no overflow risk can be foreseen, the printing head then being controlled in the normal mode in the manner shown in the chronogram of FIG. 2. In this drawing, the clock signals H supplied by clock 22 are represented on the first line, whilst the second line represents the evolution of output signal $Q_1$ of counter 23, the third line representing the evolution of the signal $Q_2$ from counter 23, the fourth line representing the control times $T_i$, on input T of register 21, of the transfer of data at its input I, the fifth line represents the control times $DEC_i$, on input DEC of register 21, of the displacement towards the left of the 2N data bits stored in register 21. The sixth, seventh and eighth lines respectively represent the time R for the return of the printing head to its abutment, time CH for the heating of the electrodes and time D for the displacement of the printing head.

At the start of printing, the printing head only blackens those dots on the line, which have an uneven sequence number. The printing cycle starts by a transfer of the 2N signals present at input I of shift register 21, into the latter at times $T_i$. Each time $T_i$ is defined by logic level 1 appearing at the output of OR gate 29, when the outputs $Q_1$ and $Q_2$ of counter 23 respectively have values 1 and 0 and when the clock signal H has the high level in FIG. 2. The heating of the resistors of the electrodes corresponding to the dots which have to be blackened on the line to be printed takes place an instant later, when simultaneously the outputs $Q_1$ and $Q_2$ of the counter 23 and signal $\overline{H}$ supplied by clock 22 have logic value 1. The 2N data bits contained in register 21 are then displaced by one step to the left, in shift register 21, at the following clock pulse, when the signal $Q_1$ from counter 23 is deenergized, whereas signal $Q_2$ from counter 23 remains at logic level 1. The displacement D of the electrode holder then takes place by compressing spring 15 throughout the duration of signal $\overline{Q_1}$ supplied by counter 23. The heating of the resistors corresponding to the dots remaining to be printed, is controlled at the end of the displacement of electrode holder 23, when simultaneously signals $Q_1$ and $Q_2$ from counter 23 have logic vaue 0 and signal $\overline{H}$ supplied by clock 22 has logic value 1. At the following clock time, when output $Q_1$ of counter 23 returns to state 1, the electrode holder is returned as a result of the interruption of the power supply to electromagnet 16 and by the action of spring 15, which expands. When the electrode holder has engaged with its abutment 14, a new printing cycle starts, after the data word present at input I of register 21 has again been transferred into the latter and the advance of the paper for printing the following line has taken place. For example, this advance of the paper can take place during the times $T_i$ of the transfer of data into register 21.

Figure 3:
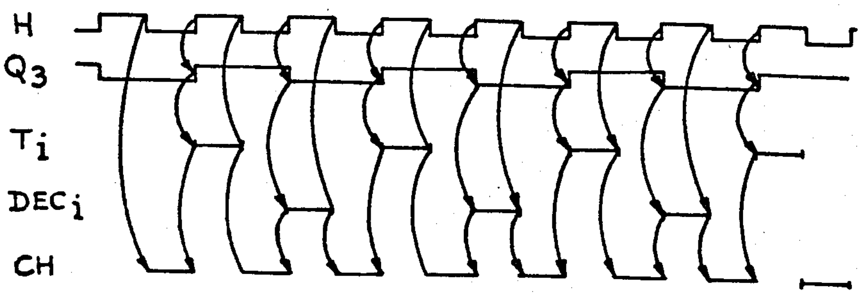
FIG. 3 a time diagram representing the operation of the printer when there is a risk of the storage means overflowing.

A second type of situation, represented by FIG. 3, can occur when a risk of overflow is indicated by state 0 of the "$\overline{\text{full}}$" signal. This signal then acts as an inhibiting means for the printing head displacement control means. In this case, there is no power supply to electromagnet 16, due to the application of the "$\overline{\text{full}}$" signal to the corresponding input of AND gate 38. In the same way it is not possible for counter 23 to advance. The synchronization of the printing head controls is replaced by the switching of flip-flop 24, which changes state with the timing of signal H of clock 22 validated by gate 40. The evolution of output $Q_3$ of flip-flop 24 is represented by FIG. 3, said signal assuming logic value 1 every two clock pulses. In this case, the transfer of the data present at input I of register 21 into the latter, takes place every two clock pulses, whenever output $Q_3$ of flip-flop 24 has logic state 1. When this transfer has taken place, the 2N bit data words contained in shift register 21 are displaced by one step to the left at the following clock pulse, when output $Q_3$ of flip-flop 24 assumes logic value 0. In the situation there is no displacement of the electrode holder, so that the heating of the resistors corresponding to the dots to be printed takes place within each clock cycle, when the clock signal H has logic value 0. In this configuration, the printing cycle of one line on the paper lasts for a time corresponding to two clock cycles, whereas in the case of the mode represented in FIG. 2, the printing cycle takes place during four clock cycles. Thus, two adjacent black dots which normally have to be blacked are replaced within the scope of FIG. 3 by a single dot, which is wider and therefore compensates the definition loss. However, this definition loss is compensated by an appreciable printing time gain, which makes it possible to considerably reduce the size of the storage devices. As in the previous case, the paper can be advanced beneath the printing head during the data transfer times $T_i$ into register 21. As the times $T_i$ are interposed (FIG. 3) between the electrode heating times, there is no risk of streaks forming on the paper during the movement thereof.

Although the principles of the invention have been described hereinbefore with reference to a specific embodiment, it is clear that the invention is not limited thereto and various variants are possible thereto without passing beyond the scope of the invention. Thus, the printing head slide could equally well be displaced by a stepping motor passing between two or more positions and controlled by a control member constituted by a microprocessor. According to this constructional variant, it is also possible to effect a parallel or series loading of a shift register equivalent to the aforementioned register 21. The choice between these two loading modes can be determined as a function of the number of dots to be printed per line. In the same way a risk of overflow of the storage means can be indicated by an equivalent device to that described hereinbefore, consisting e.g. of the counting by a counter of a microprocessor of the data words or the signals received by the storage means during given time periods and as a function of the number obtained for authorizing or preventing movements of the printing head.

What is claimed is:

1. A process for printing dots on a heat sensitive paper by means of a thermal printer comprising a printing head formed by N heating resistors, aligned in the direction of the line to be printed, signal input devices representing the dots to be printed, means for storing the signals received by the input devices, as well as means for controlling the displacement of the printing head and the heating of the resistors corresponding to the location of the dots to be printed, wherein in a first stage heating takes place of the resistors corresponding to the locations of the dots to be printed in a line directly facing these resistors and in a second stage the printing head is displaced in order to again heat the resistors on the head corresponding to the locations of the dots of the line still to be printed, and wherein the displacement of the printing head is prevented and the heating of the resistors corresponding to the dots remaining to be printed is permitted during the second stage when, the number of dots to be printed, stored in the storage means, exceeds a predetermined number of dots, in order to ensure that the number of dots to be stored does not exceed the storage capacity of the storage means.

2. A thermal printer incorporating a printing head formed by N heating resistors aligned in the direction of the line to be printed, a signal input device representing the dots to be printed, means for storing the signals received by the input devices, means for controlling the displacement of the printing head and the heating of the resistors corresponding to the dots to be printed, as well as means for inhibiting the printing head displacement control means, when the number of dots to be printed and stored within the storage means exceeds a predetermined number of dots in order to prevent an overflow of the capacity of the storage means.

3. A thermal printer according to claim 2, wherein the inhibiting means are constructed by the state of a memory zone located within the storage means, as well as by means for preventing displacements of the printing head and sensitive to the state of the storage zone.

4. A thermal printer according to claim 2, wherein the inhibiting means are constituted by a counter for the signals received by the input devices during a predetermined time period, as well as means for preventing displacements of the printing head, when the count obtained exceeds a predetermined value.

5. A thermal printer according to claim 2, wherein the means for preventing displacements of the printing head are located within the control means.

6. A thermal printer according to claim 2, wherein the control means are constituted by a microprocessor.

* * * * *